US009699525B2

(12) United States Patent
Baras et al.

(10) Patent No.: US 9,699,525 B2
(45) Date of Patent: Jul. 4, 2017

(54) METHOD AND SYSTEM FOR AUTOMATIC RESIDUAL CONSUMPTION

(71) Applicant: International Business Machines Corporation, Armonk, NY (US)

(72) Inventors: Dorit Baras, Haifa (IL); Einat Kermany, Manof (IL); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 13/745,876

(22) Filed: Jan. 21, 2013

(65) Prior Publication Data

US 2014/0203949 A1  Jul. 24, 2014

(51) Int. Cl.
*G08C 19/20* (2006.01)
*H04Q 9/00* (2006.01)

(52) U.S. Cl.
CPC ........... *H04Q 9/00* (2013.01); *H04Q 2209/60* (2013.01)

(58) Field of Classification Search
CPC .................................................. G08C 19/00
USPC ........................................ 340/870.03, 870.01
See application file for complete search history.

(56) References Cited

U.S. PATENT DOCUMENTS

| | | | |
|---|---|---|---|
| 6,088,659 A * | 7/2000 | Kelley et al. | 702/62 |
| 6,487,457 B1 * | 11/2002 | Hull et al. | 700/17 |
| 7,119,698 B2 | 10/2006 | Schleich et al. | |
| 7,669,461 B2 * | 3/2010 | Kates | 73/40 |
| 7,920,983 B1 * | 4/2011 | Peleg et al. | 702/100 |
| 8,130,107 B2 | 3/2012 | Meyer | |
| 2002/0033759 A1 | 3/2002 | Morello | |
| 2003/0216971 A1 * | 11/2003 | Sick et al. | 705/26 |
| 2004/0069345 A1 * | 4/2004 | Doan | E03B 7/04 137/357 |
| 2008/0109387 A1 * | 5/2008 | Deaver et al. | 705/412 |
| 2010/0117856 A1 * | 5/2010 | Sonderegger | 340/870.02 |
| 2010/0286937 A1 * | 11/2010 | Hedley et al. | 702/60 |

(Continued)

OTHER PUBLICATIONS

Berges et al., "Learning Systems for Electric Consumption of Buildings", Proceedings of the 2009 ASCE International Workshop on Computing in Civil Engineering, Austin, Texas, 2009.

(Continued)

*Primary Examiner* — Amine Benlagsir
(74) *Attorney, Agent, or Firm* — Ziv Glazberg

(57) ABSTRACT

A computer-implemented method performed by a computerized device, comprising: obtaining consumption data comprising readings indicating consumption of a product, the consumption data is monitored by a plurality of metering devices, wherein the metering devices are associated with a plurality of consumption entities, wherein the plurality of consumption entities comprising a consumption unit and one or more sub consumption units of the consumption unit, wherein the product is supplied serially to the one or more sub consumption units via the consumption unit; and calculating residual consumption of the plurality of consumption entities at a point in time, wherein the residual consumption is consumption of the consumption unit and which is not associated with a sub consumption unit, wherein the residual consumption is calculated based on the consumption by the plurality of consumption entities at a plurality of points in time.

10 Claims, 4 Drawing Sheets

(56) References Cited

U.S. PATENT DOCUMENTS

2012/0026004 A1\* 2/2012 Broniak et al. .......... 340/870.02
2012/0185184 A1 7/2012 Armon et al.
2012/0259583 A1\* 10/2012 Noboa ................... G05B 15/02
    702/179
2013/0278437 A1\* 10/2013 Wyk ........................ 340/870.11
2014/0142905 A1\* 5/2014 Drees ................. G06F 17/5009
    703/2

OTHER PUBLICATIONS

Zacharia M. Lahlou, "Leak Detection and Water Loss Control", A National Drinking Water Clearinghouse Fact Sheet, pp. 317-320, 2005.

\* cited by examiner

METHOD AND SYSTEM FOR AUTOMATIC RESIDUAL CONSUMPTION

TECHNICAL FIELD

The present disclosure relates Automatic Meter Reading (AMR) in general, and to processing of consumption data read by AMR systems, in particular.

BACKGROUND

Automatic Meter Reading (AMR) is a technology of automatically collecting information from metering devices. Metering devices may electronically provide their consumption reading, in a periodic manner.

In some cases, the information may be read using a mobile or handheld device capable of receiving electronically the information from the meters. In other cases, the meters may transmit to a remote device, such as a server, via a communication network, the information. The communication network may be based on a wired or wireless infrastructure, which may be dedicated for this purpose or be generic such as a power line or telecommunication infrastructure.

In some exemplary embodiments, the metering devices monitor the consumption of a utility, also referred to as product, such as for example water, gas or energy, supplied by a provider.

A water meter is an example for a metering device being used to measure consumption features such as the volume of water consumption. In some exemplary embodiments, water meters may be used throughout a water system to determine flow through a portion of the system. In some exemplary embodiments, water meters may be used to measure the volume of water consumed by residential building, by a commercial building or by sub units thereof, which are supplied with water by a public water supply system.

In some exemplary embodiments, the data collected from the metering devices is used by the provider for a variety of purposes such as but not limited to billing customers, analyzing consumption trends, detecting problems and solving them, or the like. Additionally or alternatively, the information collected by AMR coupled with analysis of the information, may be useful both for utility providers and customers to better control the consumption and production of the product.

BRIEF SUMMARY

One exemplary embodiment of the disclosed subject matter is a computer-implemented method performed by a computerized device, comprising: obtaining consumption data comprising readings indicating consumption of a product, the consumption data is monitored by a plurality of metering devices, wherein the metering devices are associated with a plurality of consumption entities, wherein the plurality of consumption entities comprising a consumption unit and one or more sub consumption units of the consumption unit, wherein the product is supplied serially to the one or more sub consumption units via the consumption unit; and calculating, by a processor, residual consumption of the plurality of consumption entities at a point in time, wherein the residual consumption is consumption of the consumption unit and which is not associated with a sub consumption unit, wherein the residual consumption is calculated based on the consumption by the plurality of consumption entities at a plurality of points in time.

Another exemplary embodiment of the disclosed subject matter is a system having a processor, the processor being adapted to perform the steps of: obtaining consumption data comprising readings indicating consumption of a product, the consumption data is monitored by a plurality of metering devices, wherein the metering devices are associated with a plurality of consumption entities, wherein the plurality of consumption entities comprising a consumption unit and one or more sub consumption units of the consumption unit, wherein the product is supplied serially to the one or more sub consumption units via the consumption unit; and calculating residual consumption of the plurality of consumption entities at a point in time, wherein the residual consumption is consumption of the consumption unit and which is not associated with a sub consumption unit, wherein the residual consumption is calculated based on the consumption by the plurality of consumption entities at a plurality of points in time.

Yet another exemplary embodiment of the disclosed subject matter is a computer program product comprising a non-transitory computer readable medium retaining program instructions, which instructions when read by a processor, cause the processor to perform a method comprising: obtaining consumption data comprising readings indicating consumption of a product, the consumption data is monitored by a plurality of metering devices, wherein the metering devices are associated with a plurality of consumption entities, wherein the plurality of consumption entities comprising a consumption unit and one or more sub consumption units of the consumption unit, wherein the product is supplied serially to the one or more sub consumption units via the consumption unit; and calculating residual consumption of the plurality of consumption entities at a point in time, wherein the residual consumption is consumption of the consumption unit and which is not associated with a sub consumption unit, wherein the residual consumption is calculated based on the consumption by the plurality of consumption entities at a plurality of points in time.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
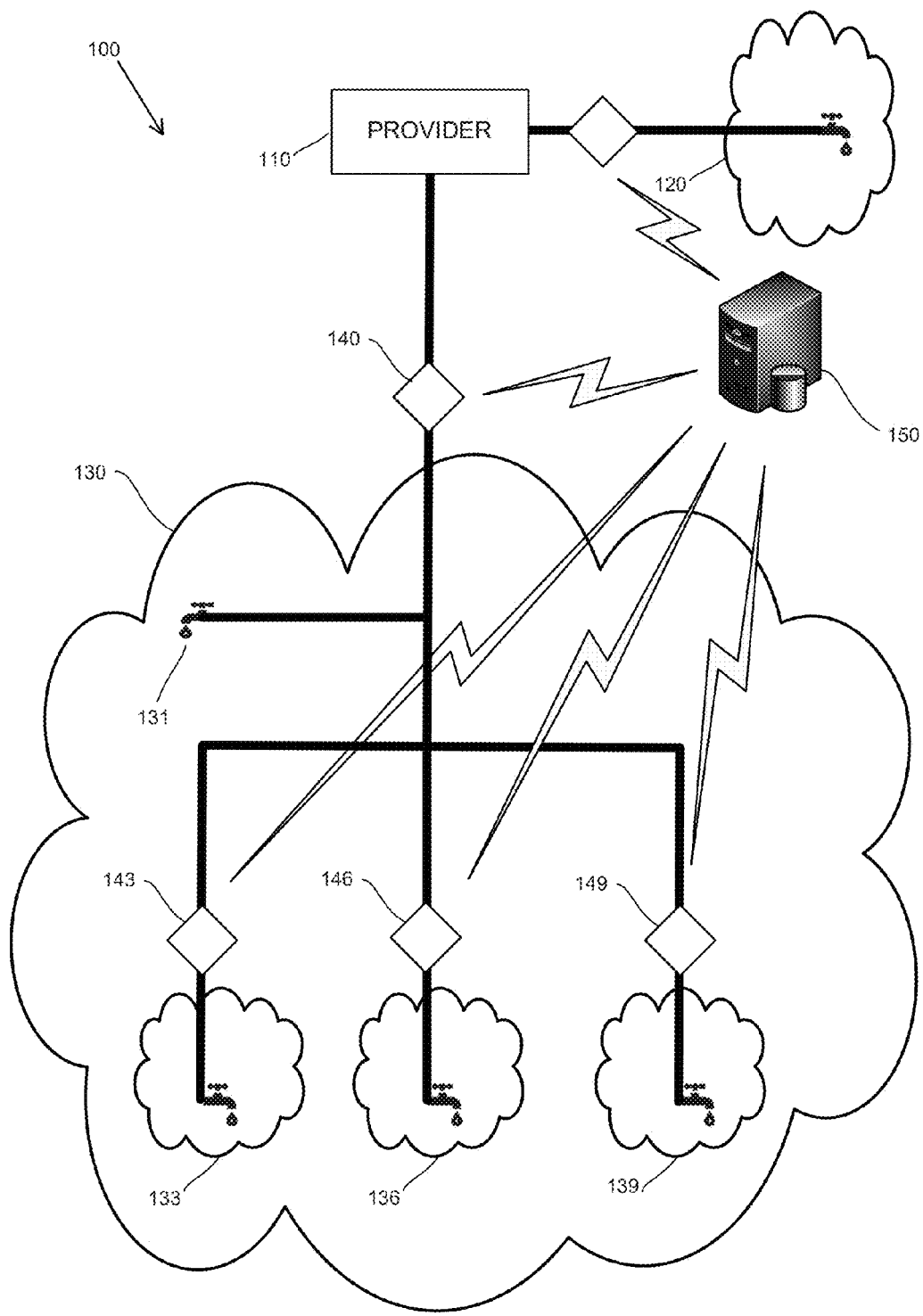
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Utilities, also referred to as products, supplied to one or more consumption units may be supplied serially through other consumption unit. In some exemplary embodiments, metering devices may monitor the consumption of the utilities by the consumption utilities. An example for such structure may be a residential building consisting apartments. In this example, water may be supplied to a main water line of the building and may be supplied therefrom to water lines of individual apartments. In this example, the building may be considered as a consumption unit which comprises a plurality of sub consumption units. Each consumption entity—be it the consumption unit or sub consumption unit—may consume the water separately. As an example, each apartment may consume the water. Additionally or alternatively, water may be consumed for common use in the building, such as for watering a garden, cleaning common areas or the like. Such consumption may be referred to as common consumption or residual consumption.

For the sake of ease of explanation, the disclosed subject matter may refer to consumption in the form of water consumption. However, the disclosed subject matter is not limited to such a utility and may be applicable to other utilities and products.

A metering device may be configured to monitor consumption by a consumption entity, such as a building, an apartment, or the like. A plurality of metering devices may be installed, each with respect to a different consumption entity thereby AMR of the water supplied to the consumption entity may be available. The meter reading may indicate an amount of cumulative consumption to the consumption unit. Based thereon, consumption may be computed in between readings (e.g., as a delta between the readings).

One technical problem dealt with the disclosed subject matter is to compute a residual consumption by a consumption unit having sub consumption units based on AMR data. Residual consumption may be consumption provided to the consumption unit and consumed at the consumption unit and not by any of its sub consumption units.

The residual consumption may be computed or estimated for a particular point in time based on readings of the relevant consumption entities at different points in time.

In some exemplary embodiments, noisy data, missing values and the like may cause a difficulty in calculating the residual consumption and quantization of the consumption.

In some exemplary embodiments, meters used for different types of entities may be configured to report at different consumption thresholds. As an example, a common area meter used for monitoring consumption of a building may report, for example, every 1000 Liter while the meters used for apartments may report of consumption every 100 Liter. Hence, a system computing a single value from the different reported readings may inherently provide inaccurate information due to inherent noise in the system.

In some exemplary embodiments, it may be hard to distinguish between stopped meters in single apartments and leaks in common area, as the same observed behavior from the AMR can indicate both events.

In some exemplary embodiments, there may be accumulative noise effects due to inherent features of the meters. As an example, different meters may be responsive to different supply rate. A meter of the apartment may be responsive to a lower level of supply rate than that of a meter of the building. As a result, in case water is supplied to the building and to the apartment at a sufficiently low supply rate the consumption may be recorded for the apartment without being accounted for with respect to the building itself. As another example, in single apartments, very low consumption may not be measured by the relevant meter; however it may be measured in the meter of the building. Such events can conceal residual consumption or be mistakenly considered as residual consumption, respectively.

In some exemplary embodiments, each meter may provide different reporting time of the consumption. In some cases, consumption reading information obtained from AMR may comprise samples on non-overlapping times. As residual consumption is based on the consumption at a specific point in time, without having consumption reading information for the different consumption entities at the specific point in time it may be difficult to calculate the residual consumption.

Another technical problem dealt with by the disclosed subject matter is detecting anomalous residual consumption. Anomalous residual consumption may be caused due to a malfunction in the infrastructure (e.g. leaks, malfunctioning meters, or the like), due to unintentional consumption (e.g., leaving a tap open), or other reasons. As residual consumption is computed indirectly anomalous residual consumption may indicate a problem at the building which may be examined.

Yet another technical problem dealt with by the disclosed subject matter is estimating consumption by a consumption entity at a point in time, when the consumption reading at the point in time was not provided by a metering device.

One technical solution is to calculate residual consumption based on the AMR data at different points in time. In some exemplary embodiments, the consumption reading data may be preprocessed to provide estimated consumption readings for each consumption entity at the point in time. Consumption reading data may be aligned to the point in time and allow for computation of aligned consumptions which are useful in calculating residual consumption, such as by subtracting from a consumption level at the consumption unit at the point in time the total consumption levels of all sub consumption units at the point in time $$\left( C_{Residual} = C_{unit} - \sum_i C_{sub\_unit_i} \right).$$

In order to calculate the residual consumption in a time resolution, such as daily resolution, readings from every day in a specific time from each meter in the building may be required. As an example, consider that as a time resolution of an hour. In such a case, it may be required to have readings from all meters at two points in time, such as 07:00 AM and in 08:00 AM. However, the AMR data may be incomplete due to missing readings and readings in different times by different meters. In some exemplary embodiments, different time resolutions may be computed for the same time, such as an hour before the time, four hours before the time, a day before the time, or the like.

The data completion may be achieved by increasing reading from a previous time period to the desired time period based on average consumption measured by the relevant meter. In some exemplary embodiments, the average consumption may be different for different time resolutions and based on historic consumption data, on information from a cluster of similar meters, or the like. As an example, assuming three hours were not monitored before 07:00 AM (e.g., last reading is from 04:00 AM), the completion may be performed using an average consumption for three hours or alternatively using potentially different predicted consumptions for each of the hours 05:00 AM and 06:00 AM.

In some exemplary embodiments, the completion may be performed using interpolation, such as for example linear or polynomial interpolations or the like, of the AMR readings of the meter to interpolate additional information not provided by the AMR readings.

In some exemplary embodiments, preprocessing may be used to clean the consumption data. Readings which are associated at times during which the meters were not monitoring the consumption may be removed. As an example, a meter may malfunction and stop monitoring but still report previous unmodified readings without adding newly consumed product after the malfunction occurred. Such meters may be referred to as stopped meters. Additionally or alternatively, in case of a newly installed meter information obtained by the replaced old meters may be removed. Using the data from the old meter may prove difficult as this may cause readings to decrease over time, while readings may be a monotonically increasing function (e.g., the water reading only increases or remains unchanged). Additionally or alternatively, replacement of a meter may indicate that the previous meter was malfunctioning and its reading may not be trusted.

Another technical solution may be to extract features from the consumption reading data useful for machine learning techniques. In some exemplary embodiments, residual consumption at one or more time resolutions may be extracted, such as for example residual consumption during the last hour, the last four hours, the last day, the last week, the last month, or the like. In some exemplary embodiments, residual consumption may for some time resolutions may be computed based on a weighted extending window of higher time resolutions. As an example, the weekly residual consumption that calculated by 7 days moving windows on the daily residual consumption. The moving window may be a weighted moving window, such as when domain knowledge is available.

In some exemplary embodiments, readings of each meter in the building, or consumption levels computed based thereof, may be used as a feature as well.

In some exemplary embodiments, additional features may be provided from an external source to the consumption reading data, such as but not limited to weather related features (e.g., temperature, humidity, rainfall), current month, current day of the week, and the like.

The machine learning algorithms may utilize the features to determine clusters of consumption units, to predict consumption of consumption units in a timeframe or the like. In some exemplary embodiments, the machine learning may require computation of distances between instances (e.g., a collection of features associated with a consumption unit in a point in time), such as but not limited to in order to identify clusters of consumption units. With respect to some features the distance may be a Euclidean distance, such as in case of the consumption. With respect to some features the distance may be a delta function indicating whether or not the two features are identical, such as in case of day of the week feature. With respect to some features the distance may be a cyclic distance, such as in case of months (e.g., the distance between December and January is one and not eleven). In some exemplary embodiments, the distance between two instances may be computed as a weighted average of the distances of their features.

Yet another technical solution is the instances may be used to provide for automatic anomaly detection. In some exemplary embodiments, for each consumption unit, an unsupervised learning algorithm may be used to determine whether the instance is within the pattern of the consumption unit or is anomalous. In some exemplary embodiments, k-nearest neighbor may be used to compute the average of the distances of k closest representations to the instance (e.g., current reading). Additionally or alternatively, the distance may be normalized by the average distances between the representations.

In some exemplary embodiments, if there is no sufficient data (e.g., at least for a predefined time period, such as a year), data may be generated synthetically to represent normal behavior of the consumption unit, such as based on a statistical model of the consumption unit, based on similar consumption units, based on consumption units in a same cluster, or the like. The instance may be compared to the generated data using a statistical test, such as for example Grubb's test. In some exemplary embodiments, in case no historical data is available, the data may be syntactically created. Additionally or alternatively, in case the historical data is of a short time period, a statistical model based on the available historic data may be used to complete the model.

In some exemplary embodiments, a confidence scope for samples considered as anomalous may be computed and used in order to indicate confidence in prediction. In some exemplary embodiments, the computed normalized distance may be used as a confidence score. In some exemplary embodiments, any or all of the following factors can be added to a model that computes confidence scope or may be provided to a person analyzing the list of suspected anomalous consumption units: (1) Number of stopped meters or meters that report lower then they suppose to; (2) Suspicious leak detected in one of the apartment's meters; (3) The irregular behavior is anomalous in a single day; (4) High residual consumption is detected in a fraction of the week; (5) knowledge about common consumption usages in the consumption unit (e.g., there is watering in that building). Other factors may also be used.

In some exemplary embodiments, the scored list and the additional factors can help the provider, such as water utility provider, to handle the cases of abnormal residual consumption in consumption units such as buildings. The scored list may be created by considerations specific to the problem of residual consumption, such as for example items (1), (2) and (5) above.

Yet another technical solution is to cluster consumption units based on features extracted from the residual consumption. All residual consumption samples may be used and/or features extracted therefrom (e.g., mean, median, standard deviation, minimum, maximum etc.) for different time resolutions (e.g., hourly, daily, weekly, etc). Correlation between the samples or distances computed therebetween may be used to determine clusters. Additional available features can be used in the clustering process (for example: number of apartments, total number of residents, existence of gardens, features regarding the consumption behavior of the residers, difference between days of the week, seasonality, number of main meters etc.)

Referring now to FIG. 1 showing a computerized environment 100 in which the disclosed subject matter is used, in accordance with some exemplary embodiments of the subject matter.

Provider 110 may be a utility provider, providing to consumption entities a product. Consumption entities may include Consumption Units 120, 130 (e.g., buildings), Sub Consumption Units 133, 136 and 139 (e.g., apartments). In some exemplary embodiments, Provider 110 may be a public supply system. Additionally or alternatively, the utility supplied by Provider 110 may be, for example, gas, water or electricity. In some exemplary embodiments, Provider 110 provides the utility to Consumption Entities 133, 136, 139 via Consumption Unit 130.

Product supplied to Consumption Unit 130 may be consumed by a sub consumption unit such as 133, 136, 139, or by Common Consumer 131, such as but not limited to tap used for watering a garden, cleaning common areas, or the like.

Meter 140 may be a meter for monitoring the utility supplied to Consumption Unit 130. Meters 143, 146, 149 may similarly monitor the utility supplied to Sub Consumption Units 133, 136, 139 respectively. Metering Devices 140, 143, 146, 149 may be of identical or different type, such as may be responsive to different rate of consumption, may report at different periods (e.g., different consumption volumes, different time periods, or the like).

Meters 140, 143, 146, 149 may be part of an AMR system and may provide consumption readings to Server 150. In some exemplary embodiments, data is transmitted to Server 150 directly or indirectly, using any communication means, such as but not limited to wireless communication, wired communication, combination thereof, or the like.

In some exemplary embodiments, Server 150 may comprise a processor. The processor comprised by Server 150, may be a Central Processing Unit (CPU), a microprocessor, an electronic circuit, an Integrated Circuit (IC) or the like. The processor of Server 150 may be utilized to perform computations required by Server 150 or any of it subcomponents. In some exemplary embodiments, Server 150 may comprise Input/Output (I/O) unit, such as for example screen and keyboard. The I/O unit may be utilized to provide an output to and receive input from a user. In some exemplary embodiments, the I/O unit may be used to provide a report of anomalous consumption units automatically detected in Computerized Environment 100. Server 150 may comprise a storage device, such as but not limited to a hard disk drive, a Flash disk, a Random Access Memory (RAM), a memory chip, or the like. In some exemplary embodiments, the storage device may retain program code operative to cause the processor to perform acts associated with any of the subcomponents of Server 150. The storage device may retain consumption readings provided by Meters 140, 143, 146, 149, consumption computed based thereof the like. In some exemplary embodiments, the storage device may retain additional features associated with consumption units such as 130, such as for example number of sub units, common consumption usages, or the like.

In some exemplary embodiments, Tap 131 may be utilized to consume product by Consumption Unit 130 and not by any of its sub units 133, 136, 139. The consumption of Tap 131 may be monitored by Metering Device 140 as part of the utility consumed by Consumption Unit 130, but no metering device indicate the consumption utilized by Tap 131 separately. It will be understood that there may be a plurality of taps or other outlets that are used for residual consumption by Consumption Unit 130.

Residual consumption of Consumption Unit 130 may be computed based on the monitored consumption readings in all meters associated with it (Meters 140, 143, 146, 149).

Figure 2:
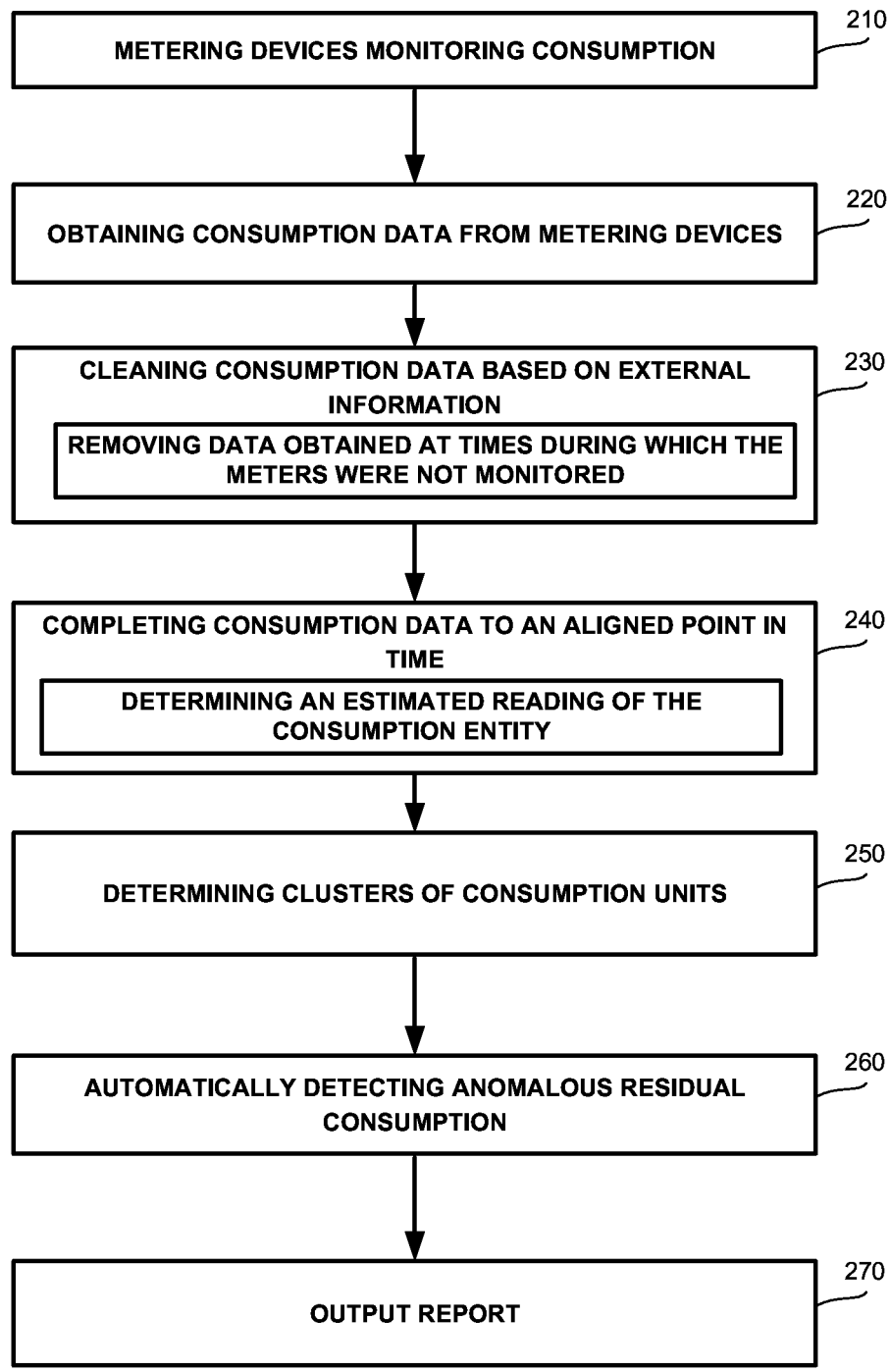
FIG. 2 shows a flowchart diagram of a method, in accordance with some exemplary embodiments of the disclosed subject matter.

Referring now to FIG. 2 showing a flowchart diagram of a method in accordance with some exemplary embodiments of the disclosed subject matter.

In Step 210, metering devices may monitor consumption by consumption entities. In some exemplary embodiments, the meters may be responsive to a provision of product and increase consumption reading in response thereof. The metering devices may be part of an AMR system.

Data obtained from metering devices may be preprocessed, such as for example is depicted in Steps 230, 240. Additional or alternative preprocessing may be performed.

In Step 220, consumption readings may be obtained from the metering devices. In some exemplary embodiments, the consumption readings may be obtained periodically using AMR.

In Step 230, consumption readings obtained by meters may be cleaned to exclude certain readings based on external information. The external information may indicate, for example, certain time periods during which a meter was not functioning properly (e.g., a stopped meter). In some exemplary embodiments, replacement times of meters or maintenance reports may indicate stopped meters and time period during which the readings are incorrect. In some exemplary embodiments, as consumption readings may not decrease over time. A decrease in the readings may indicate meter replacement and may hint that prior data should be omitted.

In Step 240, missing consumption readings may be completed. The consumption readings may be completed to provide consumption readings for different meters of the same consumption unit at the same point in time. In some exemplary embodiments, the consumption readings may be aligned to one or more time points to allow for estimation of residual consumption reading at a point in time and a computation of the residual consumption in a time frame based on estimated readings at the time points in the margins of the time frame.

In some exemplary embodiments, Step 240 may further include completion of missing readings. Completion may be based on average consumption, based on a statistical model and prediction based thereof, based on interpolation, or the like.

In Step 250, clusters of consumption units that have residual consumption may be determined. The clusters may be determined based on one or more features extracted from the consumption readings obtained from the AMR meters and preprocessed. Clusters may be further based on external features not derived from the consumption readings.

In Step 260, anomalous residual consumption may be automatically determined. The anomalous residual consumption may be determined based on a difference between the residual consumption of the unit and of units associated with the same cluster thereby detecting that anomalous usage is not due to an external reason (e.g., change in weather). Additionally or alternatively, the anomalous residual consumption may be identified based on a statistical significant difference from the consumption pattern by the unit in the past as reflected in a history database. Additionally or alternatively, the anomalous residual consumption may be identified by extracting consumption levels at a plurality of time resolutions and using said features to determine if the residual consumption is different than expected or predicted for similar instances (e.g., at similar times, in similar locations, of similar units, or the like).

Figure 3:
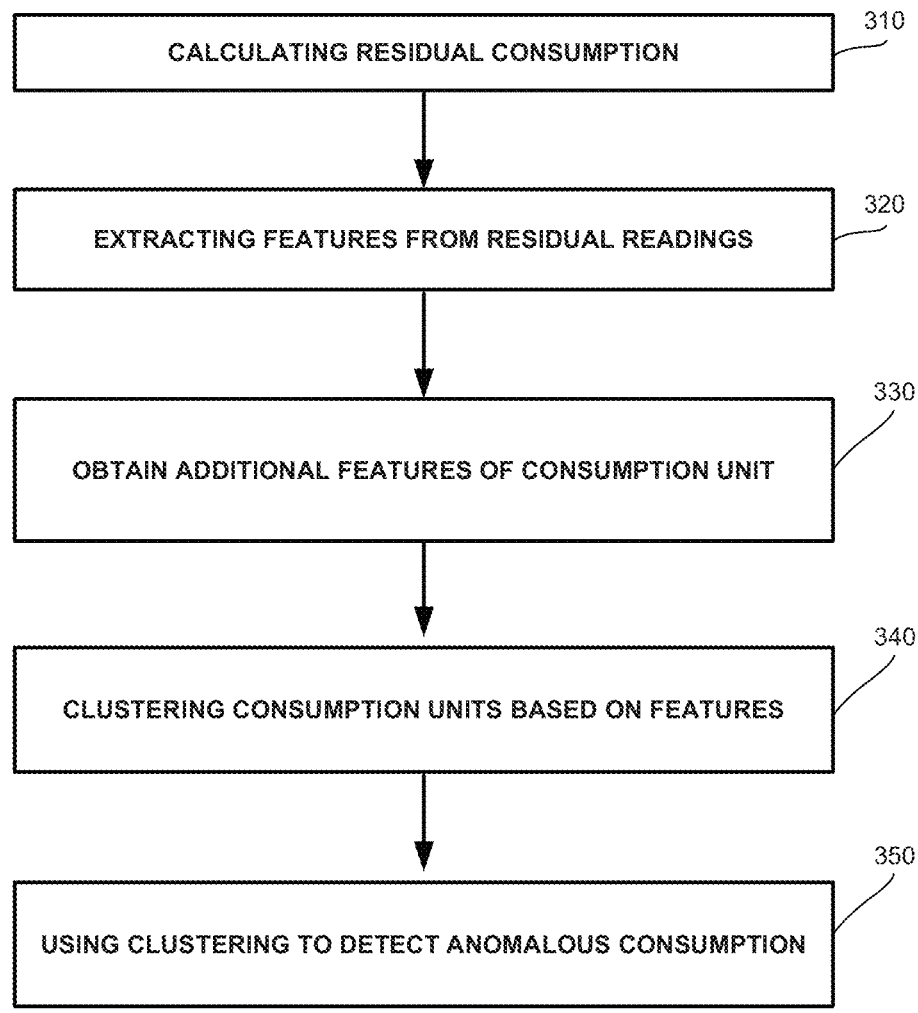
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In Step 310, residual consumption may be calculated based on consumption readings of the unit and its sub units at a same point in time. The residual consumption may be calculated with respect to one or more time resolutions.

In Step 320, features may be extracted from the residual consumption readings, such as residual consumption in a plurality of time resolutions.

In Step 330, additional features of the consumption unit may be obtained. The additional features may be, for example, a number of sub units, a type of unit, types of meters, meter replacement times, day of the week, month, weather related features, or the like.

In Step 340, consumption units may be clustered based on the features using a clustering algorithm.

In Step 350, the clusters may be used to detect anomalous residual consumption by the unit based on a difference in residual consumption of the unit and a substantial portion of the consumption units that are associated with the same cluster. As an example, 90% of the consumption units that are associated with the same cluster may be considered as a substantial portion thereof. As another example, in case there is a statisticly significant difference from 40% of the units in the cluster this may indicate that 60% of the cluster have similar consumption profile as the consumption unit and this may be deemed as not indicating anomalous residual consumption.

Figure 4:
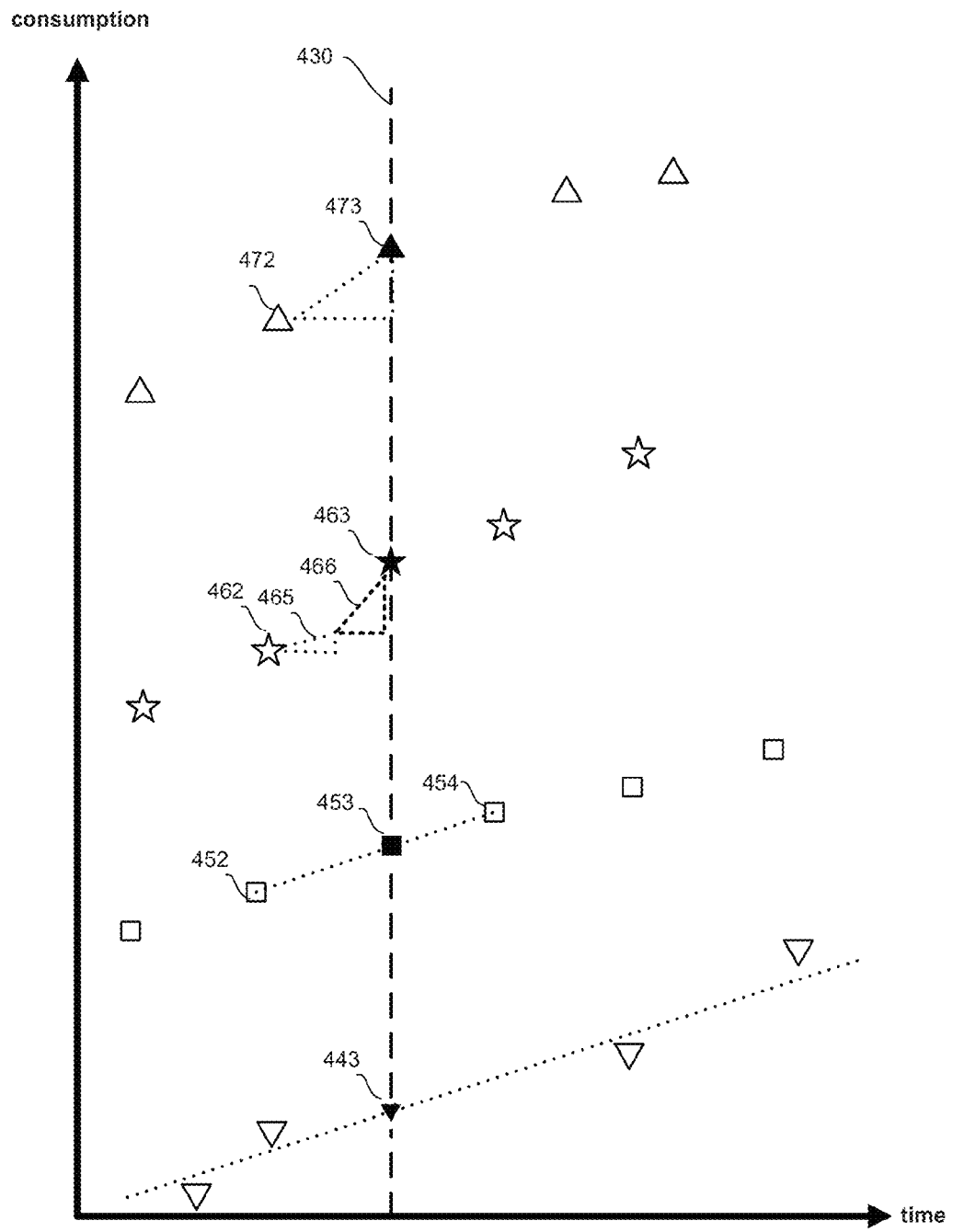
FIG. 4 shows an illustration of aligning consumption data to the same point in time, in accordance with some exemplary embodiments of the disclosed subject matter.

Referring now to FIG. 4 showing an illustration of aligning consumption readings to the same point in time, in accordance with some exemplary embodiments of the disclosed subject matter. FIG. 4 illustrates consumption readings by different meters, each reading is associated with a specific meter and is illustrated using a different symbol. A reading is illustrated using a blank symbol while an estimation is illustrated using a filled symbol.

In case a set of readings for a meter do not provide data at Time 430, the data may be completed by computing an estimated based on the other readings. Hereinbelow there are four examples of data estimation. However, other methods may be applied as well.

Estimation 443 is based on a linear interpolation of the readings by the same meter.

Estimation 453 is based on a weighted average of the closest readings to it (452, 454).

Estimation 473 is based on an average consumption during the time period between reading 472 and time 430. As an example, this may be computed using the following formula: $v_1 = v_0 + (t_1 - t_0) \cdot \text{mean}(v)$, where $v_1$ is value at Time 430, $v_0$ is value of reading 472, $t_1 - t_0$ is a number of time units between the time at reading 471 and Time 430 and mean(v) is a mean consumption for an time unit.

Estimation 463 is based on a prediction model for each time unit. The prediction model may be based on history or based on similar consumption units. In this illustration for a first time unit a first increment (465) is predicted while for a second time unit a second increment (466) is predicted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
    obtaining consumption readings indicating consumption of a product, from a plurality of metering devices, associated with a plurality of consumption entities, wherein the consumption entities comprising a plurality of consumption units and a corresponding consumption unit of the consumption units comprising a plurality of sub-consumption units, wherein the product is supplied serially to each of the sub-consumption units via the corresponding consumption unit of the consumption units;
    calculating, by a processor, residual consumption of the corresponding consumption unit of the consumption units at a point in time, wherein said calculating comprises:
    determining a consumption level of the corresponding consumption unit at the point in time;
    determining for said each of the sub-consumption units, a corresponding consumption level
    determining a first reading of the corresponding consumption level of a first sub-consumption unit of the sub-consumption units at the point in time was not measured by any of the plurality of metering devices, wherein said determining for said each of the sub-consumption units the corresponding consumption level comprises aligning consumption data of the sub-consumption units to the point in time, wherein said aligning comprises, for said each sub-consumption unit of the sub-consumption units:
    obtaining one or more readings of the corresponding consumption level of said each sub-consumption unit of the sub-consumption units at a second point in time, wherein the obtained one or more readings was measured by a metering device of the plurality of metering devices at the second point in time; and
    calculating an estimated consumption level for the first sub-consumption unit at the point in time based on the obtained one or more readings of the corresponding consumption level of said each of the sub-consumption units at the second point in time; and
    subtracting from the consumption level of the corresponding consumption unit at the point in time, a total sum of the consumption level of said each of the sub-consumption units that includes the estimated consumption level of the first sub-consumption unit at the point in time;
    determining clusters of the consumption units, wherein each cluster of the clusters comprises the plurality of the consumption units, wherein said determining clusters of the consumption units comprises extracting features from the obtained consumption readings indicating consumption of the product and computing distances therebetween, wherein at least one feature of the extracted features is based on the residual consumption of the corresponding consumption unit;
    comparing the calculated residual consumption of the corresponding consumption unit at the point in time with an expected residual consumption based on calculated residual consumption of the consumption units in a same cluster as the corresponding consumption unit;
    identifying an anomalous consumption if the comparison indicates a substantial difference between the calculated residual consumption of the corresponding consumption unit and the expected residual consumption based on the same cluster as of the corresponding consumption unit;
    wherein said identifying the anomalous consumption is based on a first and second consumptions, wherein the first consumption is associated with a first time resolution and the second consumption is associated with a second time resolution;

wherein the first and second time resolutions are different time resolutions selected from the group consisting of: an hourly resolution, a daily resolution and a weekly resolution; and wherein said determining clusters of the consumption units further comprises obtaining external features not derived from the obtained consumption readings indicating consumption of the product.

2. The computer-implemented method of claim 1, wherein the sub consumption units comprise at least two sub consumption units.

3. The computer-implemented method of claim 1, wherein the corresponding consumption unit is a building and wherein the sub consumption units are apartments.

4. The computer-implemented method of claim 1, wherein the consumption data is obtainable from the plurality of metering devices by Automatic Metering Reading (AMR).

5. The computer-implemented method of claim 1, further comprising:

removing from the obtained consumption readings indicating consumption of the product, readings obtained by the metering device in a time period during which the metering device did not monitor consumption of the product.

6. The computer-implemented method of claim 1, wherein the product is selected from the group consisting of: water, electricity, and gas.

7. The computer-implemented method of claim 1, wherein said determining clusters of the consumption units further comprises extracting features of the residual consumption of the corresponding consumption unit in different time resolutions.

8. A system, comprising:

a plurality of metering devices, wherein a computerized device configured for obtaining consumption data comprising one or more readings indicating consumption of a product, from the plurality of metering devices, associated with a plurality of consumption entities, wherein the consumption entities comprising a plurality of consumption units and a corresponding consumption unit of the consumption units comprising a plurality of sub-consumption units, wherein the product is supplied serially to each of the sub-consumption units via the corresponding consumption unit of the consumption units;

a processor configured for calculating residual consumption of the corresponding consumption unit of the consumption units at a point in time, wherein said calculating comprises:

determining a consumption level of the corresponding consumption unit at the point in time;

determining for said each of the sub-consumption units, a corresponding consumption level determining a first reading of the corresponding consumption level of a first sub-consumption unit of the sub-consumption units at the point in time was not measured by any of the plurality of metering devices, wherein said determining for said each of the sub-consumption units the corresponding consumption level comprises aligning the consumption data of the sub-consumption units to the point in time, wherein said aligning comprises, for said each sub-consumption unit of the sub-consumption units:

obtaining the one or more readings of the corresponding consumption level of said each sub-consumption unit of the sub-consumption units at a second point in time, wherein the one or more readings was measured by a metering device of the plurality of metering devices at the second point in time; and calculating an estimated consumption level for the first sub-consumption unit at the point in time based on the obtained one or more readings of the corresponding consumption level of said each of the sub-consumption units at the second point in time; and subtracting from the consumption level of the corresponding consumption unit at the point in time, a total sum of the consumption level of said each of the sub-consumption units that includes the estimated consumption level of the first sub-consumption unit at the point in time;

wherein said processor is further configured for determining clusters of the consumption units, wherein each cluster of the clusters comprises the plurality of the consumption units, wherein said determining clusters of the consumption units comprises extracting features from the obtained one or more readings and computing distances therebetween, wherein at least one feature of the extracted features is based on the residual consumption of the corresponding consumption unit;

wherein said processor is further configured for comparing the calculated residual consumption of the corresponding consumption unit at the point in time with an expected residual consumption based on calculated residual consumption of the consumption units in a same cluster as the corresponding consumption unit;

wherein said processor is further configured for identifying an anomalous consumption if the comparison indicates a substantial difference between the calculated residual consumption of the corresponding consumption unit and the expected residual consumption based on the same cluster of the corresponding consumption unit;

an input/output unit through which the processor provides an indication of the anomalous consumption;

wherein said identifying the anomalous consumption is based on a first and second consumptions, wherein the first consumption is associated with a first time resolution and the second consumption is associated with a second time resolution;

wherein the first and second time resolutions are different time resolutions selected from the group consisting of: an hourly resolution, a daily resolution and a weekly resolution; and wherein said determining clusters of the consumption units further comprises obtaining external features not derived from the obtained one or more readings.

9. The system of claim 8, wherein the computerized device is configured to obtain the consumption data by Automatic Metering Reading (AMR).

10. The system of claim 8, wherein the processor is further adapted to pre-process the consumption data to exclude a portion of the obtained one or more readings and to introduce estimated readings.

* * * * *